Figure 5:
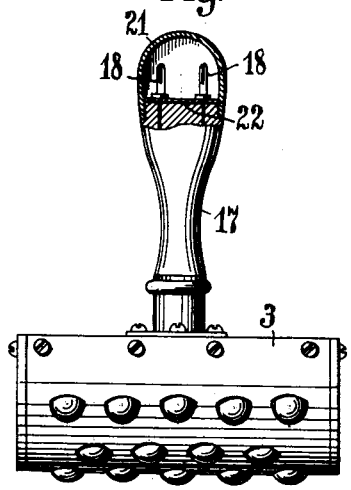

Feb. 26, 1929.
R. BLUM
1,703,811
IMPLEMENT FOR SUPPLYING HEAT TO THE HUMAN BODY
Filed Aug. 26, 1927  2 Sheets-Sheet 1
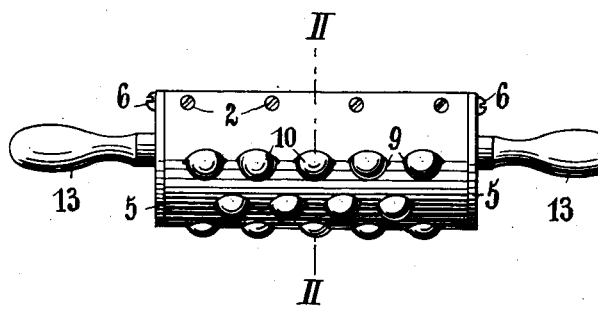
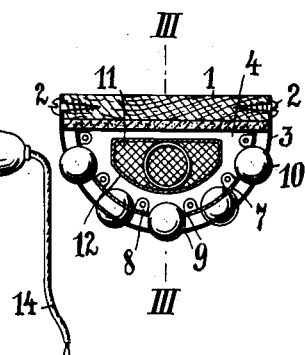
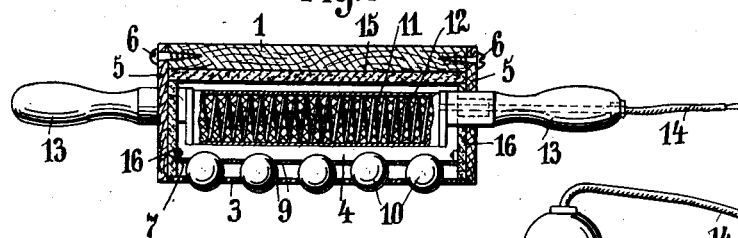
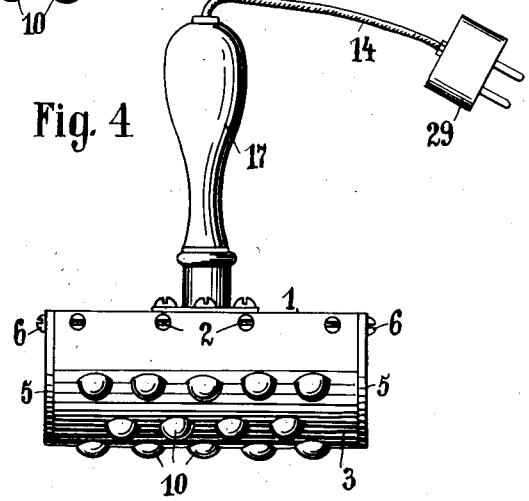

Feb. 26, 1929.  
R. BLUM  
1,703,811  
IMPLEMENT FOR SUPPLYING HEAT TO THE HUMAN BODY  
Filed Aug. 26, 1927  2 Sheets-Sheet 2

Inventor:
Richard Blum
by Locke, Kehlenbeck & Farley
Attorneys

Patented Feb. 26, 1929.

1,703,811

UNITED STATES PATENT OFFICE.

RICHARD BLUM, OF BERLIN, GERMANY.

IMPLEMENT FOR SUPPLYING HEAT TO THE HUMAN BODY.

Application filed August 26, 1927, Serial No. 215,601, and in Germany February 12, 1927.

My invention relates to implements for supplying heat to the human body and it is an object of my invention to provide an implement of this type in which the inconvenience and risk to the user involved in the necessity for keeping the implement connected with a source of thermic energy, for instance, an electric system, are eliminated.

With this object in view, I equip my novel implement with a heat accumulator of such capacity that the implement will be at the required elevated temperature during its—generally short—periods of operation. The implement is connected with the source of thermic energy until it has attained the desired temperature and then its connection with the source is broken.

Other objects of my invention will appear from the detailed description below.

By way of example, a massage implement having an electric heating resistance and a heat accumulator for absorbing the generated heat, will be shown and described, but it is understood that I am not limited to this particular type of implement nor to the particular means of supplying thermic energy to, and storing it in, such implement.

The existing implements of this type involve the drawback that it is necessary to maintain their connection with the source of energy, that is, in the example referred to, the cable supplying them with current must be permanently attached. Apart from the risk and inconvenience involved by such cable which interferes with the ready manipulation of the apparatus, the proper temperature may be exceeded due to carelessness, causing burns and other trouble.

These drawbacks are overcome in my invention by providing a heat accumulator of such capacity that the heat emitted by such accumulator after the energy supply has been cut out, is sufficient for the desired object. In operation, the implement is connected with the system and a heating resistance of the implement is heated as required, whereupon the connection is broken and the implement may now be used as an independent unit, eliminating any risk and incovenience from a permanent cable connection.

The materials from which my implement is made, are so selected, and the implement is so designed, that a suitable rate of heat absorption and heat emission will be obtained.

In order to remove any tendency or inducement on the part of the operator to maintain the connection of the implement with its source of energy during operation, means may be provided for compelling the person to break the connection before operating the implement. A very simple expedient is to make the cable from the stationary contact on the system to the contact on the implement so short that the implement cannot be operated with the cable attached, or the cable is eliminated altogether and the contact is secured directly to the implement, for instance, its handle, so that the handle, with the contact thereon, is attached to a wall socket. Instead of securing the contact to the handle it may be secured to the casing of the instrument and this involves the advantage that all connections intermediate the contact and the heating resistance are eliminated.

For instance, I may construct on the above lines, an implement for massage by hand having spherical flesh engaging members which are mounted in the implement for universal rotation, so that the implement is free to act in any direction, as desired.

The action of existing implements is merely mechanical, and is developed by exerting pressure on the flesh. In this manner, an effective massage may be obtained but the pores are not opened and fatty and other undesirable substances are not removed. On the other hand, my novel implement opens the pores and allows them to discharge such matter, by heat. The flesh engaging members are made from heat-conducting material, for instance, metal, so as to transfer the heat from the resistance to the flesh and facilitating the expulsion of the substances from the pores.

In the accompanying drawings, several electric massage implements embodying my invention are illustrated diagrammatically by way of example.

Figure 6:
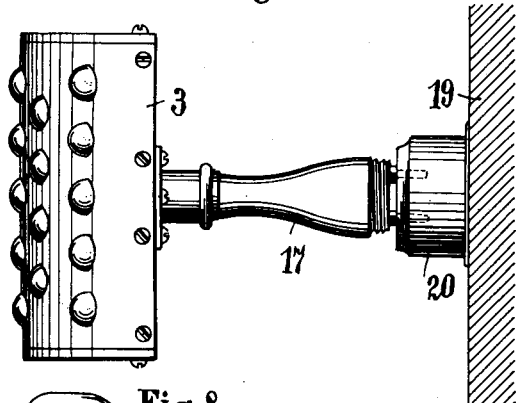
Figure 7:
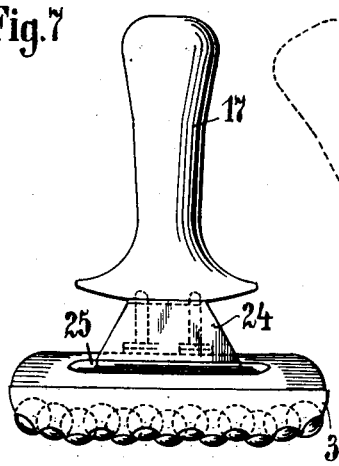
Figure 8:
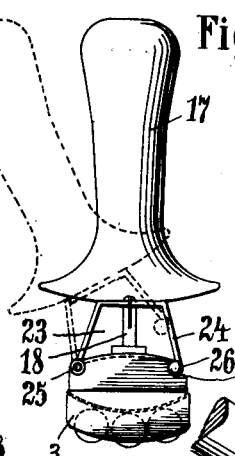
Figure 9:
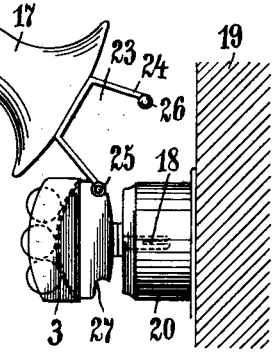

In the drawings,

Figs. 1, 2, 3, and 4 are an elevation, a section on the line II—II in Fig. 1, a section on the line III—III in Fig. 2, of an instrument having a cable attached to one of its two handles, and an elevation of an instrument having a single handle, with the cable attached thereto, respectively, Figs. 5 and 6 are elevations of an implement having its contact member directly attached to its handle, showing the implement in operative position, partly in section, and attached to a wall socket, respectively, Figs. 7, 8, and 9 are an elevation, an end elevation and a fragmentary illustration, of an implement having its contact member attached to the casing instead of the handle.

Referring first to Figs. 1, 2 and 3, 1 is a base plate made from a material which is a poor heat conductor, say wood, of rectangular configuration, to which is attached a casing 3, of sheet metal or other suitable material, and preferably of semicylindrical configuration. 2 are screws holding the casing to the base plate 1; 5 are end plates which may also be of wood and are attached to the ends of the plate 1 by screws 6; 7 is a liner spaced from, and arranged within, the casing 3; 8 are screws holding the liner to the end plates 5; 9 are holes in the casing 3 and the liner 7, and 10 are spherical flesh engaging members arranged in each pair of holes in the casing and the liner so as to be held between these parts by their equators. The holes are arranged in rows, and the holes in the several rows are preferably staggered with respect to those of the adjacent rows. Five rows of members 10 are shown but obviously any other number including a single pair of holes with a single member 10 might be provided.

Obviously, other means might be provided for supporting the members 10, and they may be made of other material than metal, provided it is a good heat conductor.

A heating resistance having a wire 12 and an insulator 11—any other type of heating resistance may obviously be provided instead— is arranged in the space 4 constituted by the liner 7 and is held out of contact with the liner by the handles 13, 13 to one of which a cable 14 is attached. The end plates and the base plate are lined with layers 15 and 16, of asbestos, keramic substance, or any other poor conductor of heat. These layers, in co-operation with the other parts of the implement, and particularly the members 10, make up the accumulator, that is, a heat storing unit of large capacity, as required for maintaining the implement at the desired temperature for a sufficiently long time.

Means as a switch or a thermostat may be provided for regulating the temperature of the heating resistance 11, 12, and, if desired, paint may be applied to the implement which will indicate the temperature limit by changing its colour.

In operation, the implement is connected to an electric or other system like any other apparatus, through the medium of its cable 14, so that heat is developed until the temperature limit is attained and the implement is then disconnected and operated as an independent unit. For instance, with a heating resistance 11, 12 having a capacity of 60 watts, two or three minutes will be sufficient for attaining the limit, say 70 to 80 deg. centigrade. It has been found that the implement, and particularly its members 10, preserves this temperature for almost one hour which is ample, the normal duration of a massage operation being about 15 minutes, or less.

The free rotation of the members 10 is not interfered with by their increased diameter upon heating. Their action is very efficient due to their staggered arrangement, the pores will open and any obnoxious substances will be expelled.

The implement illustrated in Fig. 4 has only one handle 17 at the centre of its base plate and the cable 14 is attached to this handle. 29 is a plug contact adapted to be inserted in the wall socket, not shown, of an electric circuit. The cable 14, as illustrated, is so short that the implement cannot be used unless the contact member 29 has been detached from the wall socket.

Referring now to Figs. 5 and 6, the arrangement of the handle 17 is similar to that in Fig. 4 but contact or terminal members 18 are secured to the end of the handle instead of to a cable, and connected with the resistance 11, 12 by conduits in the handle. A cap or guard 21 is placed over the contact members when they are not used. Obviously, the handle might be made of insulating material and in this case the plate 22 in which the contact plugs 18 are secured, is dispensed with.

It will appear that no cable is provided in this instance. In operation, the cap or guard 21 is removed and the handle 17 is attached to a socket 20 on a wall 19, as shown in Fig. 6, until the desired temperature limit has been attained when the handle is removed from the socket and the cap 21 is replaced. The cap may be threaded or provided with a bayonet joint or other readily operated means for holding it on the handle.

Referring now to Figs. 7, 8, and 9, the terminal members or plugs 18 are secured to the casing 3 and normally concealed in the cavity 23 of a cap or guard 24 which may be of channel section and is attached to the handle 17 at its back. 25 is a hinge connecting one of the flanges of the guard with the casing 3 and 26 is a projection at the end of the other flange which is adapted to engage a recess 27 on the casing, like a spring catch, so as to hold the casing or guard 24 in position on the casing 3, as shown in full lines in Fig. 8. With this arrangement, the conduits in the handle 17 which connect the plugs 18 with the heating resistance, are eliminated, and, needless to say, there is no cable 14 so that this construction is particularly simple and cheap in proportion.

In operation, the guard 24 is tilted about its hinge 25 into the position shown in dotted lines in Fig. 8 so as to expose the plugs 18 which may then be inserted in the socket 20. When the desired temperature limit has been attained the implement is removed from the socket 20, the guard 24 is tilted back so as to conceal the plugs 18 and the spring catch 26, 27 is reinserted.

I claim:

1. A massage implement comprising a heat-insulated casing, an electric heating resistance in said casing, a rotary flesh engaging member of heat conducting material carried by said casing in heat receiving relation to said resistance, a contact member on said casing, a conduit intermediate said contact member with said resistance, a guard movably mounted on said casing, surrounding said contact member, and a handle on said guard adapted to displace said guard so as to expose said contact member.

2. An implement for supplying heat to the human body, comprising electrically operated heat developing and accumulating means, current supplying means adapted for detachable connection with a fixed element in circuit with a source of electricity for supplying current to said heat developing and accumulating means, said current supplying means being constructed and arranged to require its disconnection from said fixed element before the implement can be operatively utilized, a handle for manually manipulating said heat developing and accumulating means, and a device connected with said handle for covering said current supplying means when the latter is disconnected from said fixed element.

3. An implement for supplying heat to the human body, comprising a casing, a handle projecting from said casing for manually manipulating said implement, an electric heating resistance within said casing, accumulating means within said casing for storing the heat developed by said resistance, and current supplying means adapted for detachable connection with a fixed element in circuit with a source of electricity for supplying current to said resistance, said current supplying means being in rigid connection with said implement and extending in the direction of the length of said handle and requiring disconnection from said source of electricity before the implement can be operatively utilized.

4. An implement for supplying heat to the human body, comprising an electric heating resistance, accumulating means for storing the heat developed by said resistance, a casing containing said heating resistance and heat accumulating means, a handle connected with said casing for manually manipulating said implement, and contact plugs connected with said resistance and mounted directly on said implement for detachable connection with a fixed electrical socket of conventional form to supply current to said resistance, said contact plugs being constructed and arranged to require its disconnection from said source of electricity before the implement can be operatively utilized.

5. An implement for supplying heat to the human body, comprising an electric heating resistance, accumulating means for storing the heat developed by said resistance, a casing containing said heating resistance and heat accumulating means, contact plugs connected with said resistance and rigidly mounted on said casing for detachable connection with a fixed electric socket of conventional form, said contact plugs being constructed and arranged to require their disconnection from said source of electricity before the implement can be operatively utilized, a guard hinged to said casing for covering said plugs when the latter are disconnected from said socket, and a handle connected with said guard for swinging the same on its hinge and for manually manipulating the implement In testimony whereof, I hereunto affix my signature at Berlin the 8th of August, 1927.

DR. RICHARD BLUM.